United States Patent
Warren

(10) Patent No.: US 6,218,840 B1
(45) Date of Patent: Apr. 17, 2001

(54) APPARATUS ALLOWING CONTINUOUS RADIO DETECTION OF UNDERGROUND UTILITIES WHILE MAINTAINING CATHODIC ISOLATION

(76) Inventor: John Fridy Warren, 8480 Hogue Rd., Evansville, IN (US) 47712

( * ) Notice: Subject to any disclaimer, the term of this patent is extended or adjusted under 35 U.S.C. 154(b) by 0 days.

(21) Appl. No.: 09/307,408

(22) Filed: May 8, 1999

Related U.S. Application Data

(60) Provisional application No. 60/085,901, filed on May 18, 1998.

(51) Int. Cl.$^7$ .............................. G01V 3/08; G01R 19/00; H02G 9/00; E03B 7/00
(52) U.S. Cl. ............................. 324/326; 324/67; 174/37; 405/157
(58) Field of Search ............................... 324/66, 67, 326, 324/528, 529; 379/25, 26; 405/157; 174/37, 260, 261

(56) References Cited

U.S. PATENT DOCUMENTS

| | | | |
|---|---|---|---|
| 4,143,251 | * 3/1979 | Clark | 324/67 |
| 4,767,237 | * 8/1988 | Cosman et al. | 324/326 X |
| 4,866,388 | * 9/1989 | Cosman et al. | 324/67 X |
| 5,116,654 | * 5/1992 | Cosman et al. | 324/67 X |

* cited by examiner

*Primary Examiner*—Gerard R. Strecker
(74) *Attorney, Agent, or Firm*—George H. Morgan

(57) ABSTRACT

The present invention is a means of allowing continuous radio detection of underground utilities while maintaining cathodic insulation of metal utility conduits such as gas mains and pipes. By using a capacitor between a metal gas main and an old metal gas service line, the gas main is isolated from the service line. A short in the tracer line against the old metal gas service line will not result in an electrical connection with the metal gas line that increases the rate of deterioration of the cathodic protection anode. Using the capacitor in the tracer wire system eliminates check points isolating tracer wire sections. In the preferred embodiment of the present invention, the capacitor assembly comprises a ceramic nonpolar capacitor ranging from 0.01 microfarad to 1.0 microfarad encased in an epoxy plastic contained in a case. The tracer wire leads are of 14 gauge oxygen free copper.

1 Claim, 2 Drawing Sheets

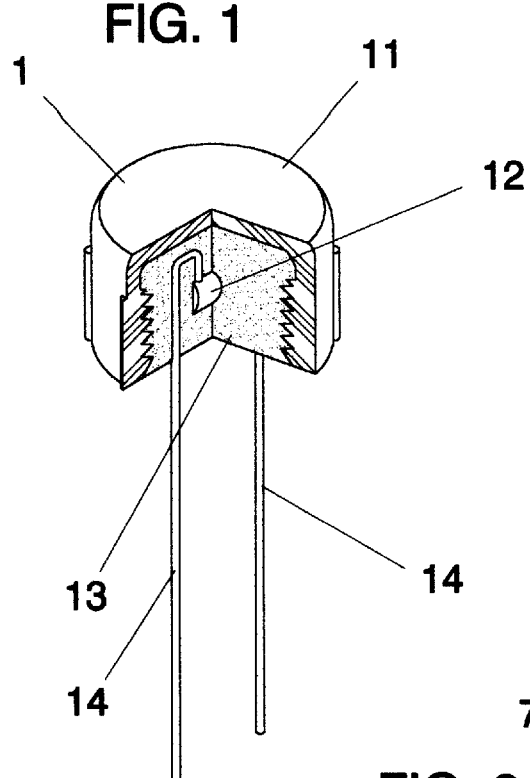
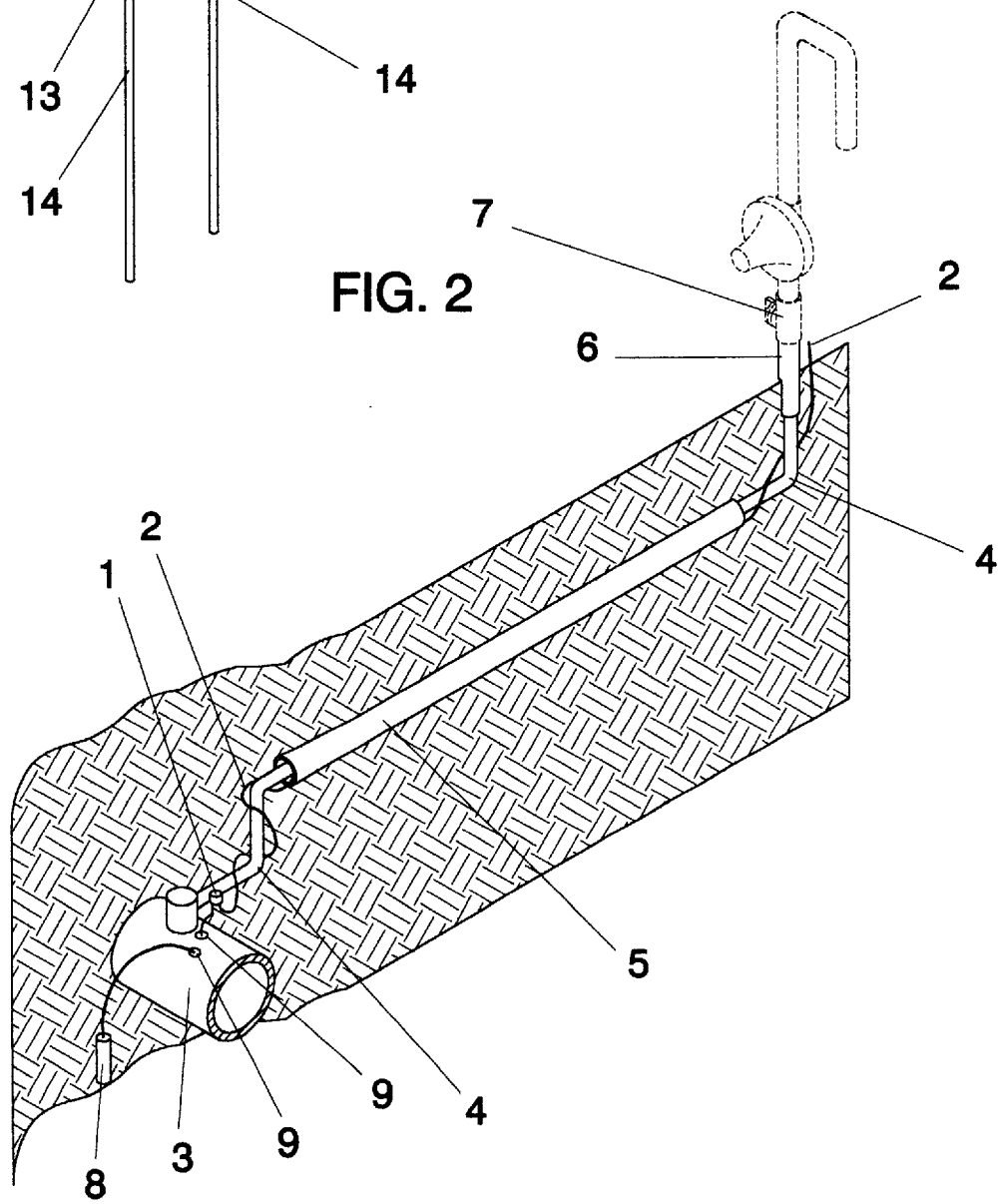

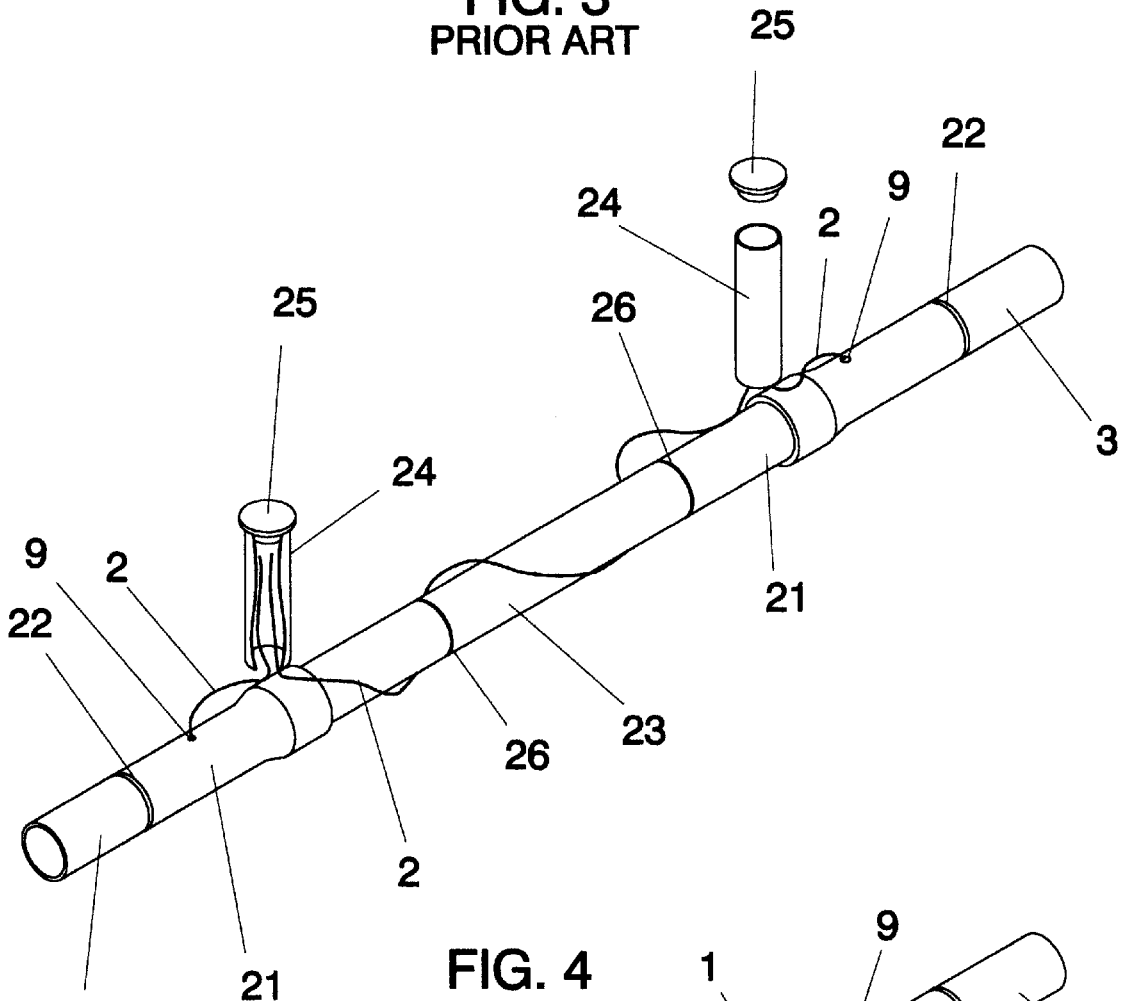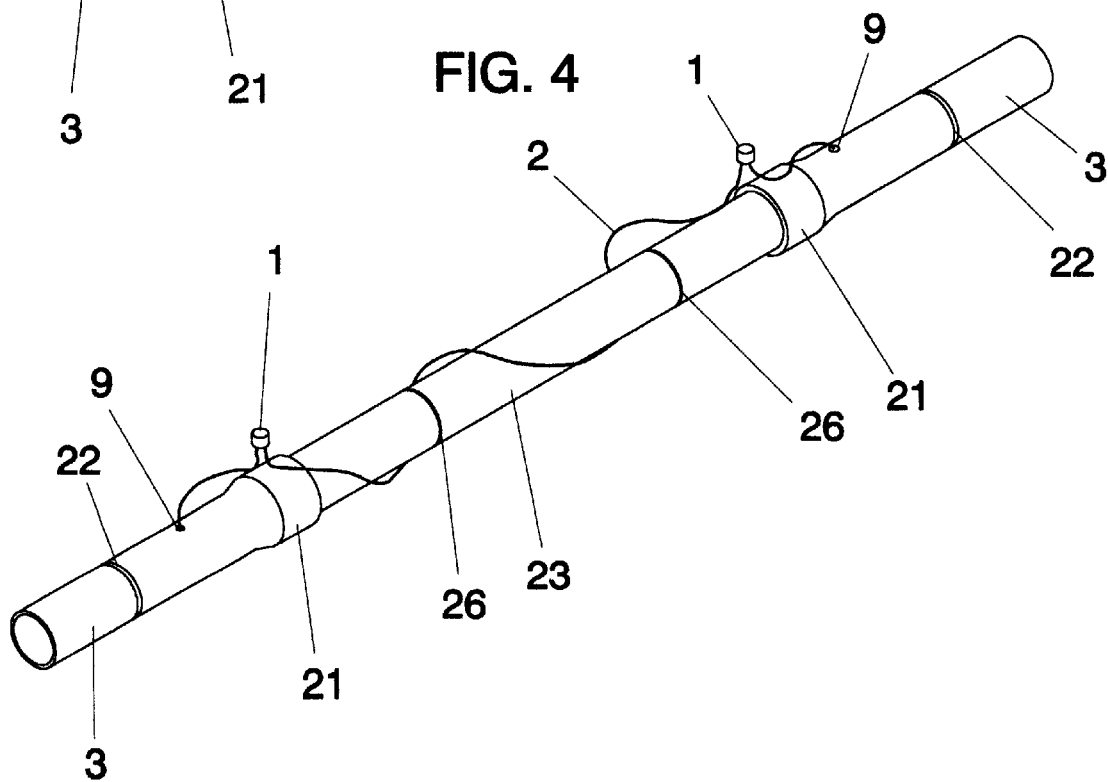

APPARATUS ALLOWING CONTINUOUS RADIO DETECTION OF UNDERGROUND UTILITIES WHILE MAINTAINING CATHODIC ISOLATION

CROSS REFERENCES TO RELATED APPLICATIONS

Pursuant to 35 U.S.C. Par. 119(e)(i) applicant claims priority of Provisional Application for Patent 60/085,901 of May 18, 1998 "Method For Allowing Continuous Radio Detection Of Underground Utilities While Maintaining Cathodic Isolation".

STATEMENT AS TO RIGHTS TO INVENTIONS MADE UNDER FEDERALLY SPONSORED RESEARCH AND DEVELOPMENT

Not applicable.

BACKGROUND OF THE INVENTION

1. Field of the Invention

This invention relates to isolating cathodic protection of underground utilities while permitting signals, such as underground locating signals, to be transmitted along the underground utilities. Such signals include, but are not restricted to, radio signals.

2. Background Information

Cathodic protection of underground pipe including steel gas mains is a common practise to prevent corrosion in the utilities industries. This can be a galvanic protection system or an impressed current protection system.

In a galvanic protection system, it is a common practise to have a corrosion protection anode electrically connected to a metal gas main so as to provide galvanic protection to the metal gas main. In galvanic protection, a metal substance that is strongly anodic to steel, usually magnesium or zinc, is buried in the ground adjacent to the steel gas main and connected to it with copper wire. This establishes an electrochemical cell or battery in which the buried metal is the anode, the steel gas main is the cathode, and the soil is the electrolyte.

In an impressed-current protection system, a large mass of expendable metal or graphite, called a ground bed, is buried in the ground some distance from the pipe. This ground bed is connected to the positive side of a source of direct current and the pipe is connected to the negative side. The current source can be viewed as a pump for electrons with its suction side connected to the ground bed and its discharge connected to the pipe. As electrons are removed from the material in the ground bed, an electron-generating or anodic reaction occurs at its surface. The exact nature of the reaction depends primarily on the material of the ground bed.

In both types of cathodic protection, flow of current occurs through the soil, from the buried material to the pipe.

The anode deteriorates, but the metal gas main is protected from corrosion.

In original installations there are metal service lines from the metal gas main to customers' gas meters. As these deteriorate, it is a common practise to insert plastic gas service tubing through the deteriorated metal gas service lines. In the United States, it is a Dept. of Transportation requirement, (RE 49 CFR Ch.1 Part 192.321 e) to have a method of locating the plastic gas service tubing. A common way to do this is to have a tracer wire installed with the plastic tubing so signals such as radio signals can be transmitted through the tracer wire. When one is searching for the location of the plastic gas service tubing, one can send a signal, such as a radio signal, through the tracer wire while a person with a detector can detect the location of the plastic tubing.

A problem with using a tracer wire with the plastic tubing within a metal pipe is that if a short occurs between the tracer wire and the metal pipe, there is a direct electrical connection between that metal pipe and the gas main to which the tracer wire was connected. This causes the corrosion protection anode to deteriorate much faster, as it is now trying to protect not only the gas main, but also the metal pipe through which the plastic tubing was inserted. This is not desirable.

FIG. 3 illustrates a prior art solution to the problem of how to attach a tracer wire 2 to a metal gas mains 3 while keeping the gas main 3 isolated so shorts in the tracer wire 2 do not compromise the cathodic protection of the gas mains. Valve boxes 24 with covers 25 are used as check points, where sections of tracer wire 2 are isolated from other sections of tracer wire 2. A problem with this is that if one of the valve boxes 24 with a cover 25 is removed, plowed under, paved over, or otherwise lost, tracing the elements of a utility distribution system becomes more difficult. Also shown in FIG. 3 are the prior art steel to plastic transition mains 21 which are connected to the gas mains 3 by means of the welds 22. The steel to plastic transition mains 21 are then coupled to the plastic main 23, typically by a plastic weldment 26. The steel to plastic transition mains 21 are typically a steel pipe coupled to a plastic pipe and serve as a bridge between the metal gas mains 3 and the plastic main 23. Tackwelds 9 connect sections of tracer wire 2 to the steel side of the steel to plastic transition mains 21.

As will be shown in the subsequent description of the preferred embodiments of the present invention, these and other shortcomings of the prior art are overcome.

SUMMARY

The present invention is a means of allowing continuous radio detection of underground utilities while maintaining cathodic insulation of metal utility conduits such as gas mains and pipes. By using a capacitor between a metal gas main and an old metal gas service line, the gas main is isolated from the service line. A short in the tracer line against the old metal gas service line will not result in an electrical connection with the metal gas line that increases the rate of deterioration of the cathodic protection anode. Using the capacitor in the tracer wire system eliminates check points isolating tracer wire sections. In the preferred embodiment of the present invention, the capacitor assembly comprises a ceramic nonpolar capacitor ranging from 0.01 microfarad to 1.0 microfarad encased in an epoxy plastic, contained in a case which is a schedule 40 PVC, i.e. polyvinylchloride, cap such as is common in the plumbing industry, with insulated tracer wire leads of 14 gauge oxygen free copper.

BRIEF DESCRIPTION OF THE DRAWINGS

FIG. 1 illustrates a capacitor assembly.

FIG. 2 illustrates an application of the capacitor assembly as typically applied to new construction.

FIG. 3 illustrates prior art discussed in the preceeding background information.

FIG. 4 illustrates an application of the capacitor assembly as a retrofit to a prior art installation such as is shown in FIG. 3.

DESCRIPTION OF THE PREFERRED EMBODIMENTS

FIG. 1 illustrates a preferred embodiment of a capacitor assembly 1 comprising a capacitor 12, with tracer wire leads 14, said capacitor 12 and a portion of said tracer wire leads 14 encapusulated in epoxy potting compound 13 within a case 11. In the preferred embodiment of the present invention said capacitor 12 is a ceramic nonpolar capacitor with a rating in a range of 0.01 to 1.0 microfarads. The tracer wire leads 14 are insulated wire leads of oxygen free copper from the same wire as used for tracer wire 2 to be shown in FIG. 2. An epoxy potting compound suitable for use as the expoxy potting compound 13 is commercially available as GC Electronics Series 2 GC Potting Epoxy carried by electrical distributors such as Hutch & Son of Evansville, Ind.

FIG. 2 illustrates the application of the capacitor assembly 1 with a tracer wire 2 wrapped around plastic service tubing 4 installed within an existing iron or steel customer service pipe 5. One of the tracer wire leads 14 of the capacitor assembly 1 is coupled to a metal gas main 3. The other lead 14 is coupled to the tracer wire 2. A cathodic protection anode 8 is coupled to the metal gas main 3. The preferred means of attachment of a tracer wire lead 14 and the cathodic protection anode 8 to the metal gas main 3 is by a tackweld 9. A plastic to steel transition 6 is shown coupled to a customer 7 meter service. If the tracer wire 2 shorts out against the existing iron or steel customer service pipe 5, the capacitor assembly 1 isolates the cathodic protection anode 8 so that the cathodic protection anode 8 is not sacrificed providing cathodic protection to the exisitng iron or steel customer service pipe 5 that has been replaced by the plastic service tubing 4 that was installed as a replacement service for the existing iron or steel customer service pipe 5. The tracer wire 2 is an insulated wire of 14 gauge oxygen free copper which is common to the utility trade.

FIG. 3 illustrates prior art that was discussed in the Background Information.

FIG. 4 is identical to FIG. 3 as described in the Background Information except the valve boxes 24 with covers 25 have been replaced with the capacitor assemblies 1. This both isolates the tracer wire 2 that is wrapped around the plastic main 23 from being cathodically protected by the metal gas main 3 and also eliminates having to bring up the tracer wire 2 separately in a valve box 24 with cover 25 at joints of dissimilar mains, such as the steel to plastic transition mains 21 shown in FIGS. 3 and 4. As in FIG. 3, FIG. 4 shows the prior art steel to plastic transition mains 21 which are coupled to the gas mains 3 by means of the welds 22. The steel to plastic transition mains 21 are then coupled to the plastic main 23, typically by a plastic weldment 26. As previously stated, the steel to plastic transition mains 21 are typically a steel pipe coupled to a plastic pipe and serve as a bridge between the metal gas mains 3 and the plastic main 23. The capacitor assembly 1 is grounded to the steel side of the steel to plastic transition main 21, typically by a tackweld 9.

FIG. 4 illustrates the preferred embodiment of the present invention, a means of allowing continuous radio detection of underground utilities while maintaining cathodic isolation. This means comprises the addition of a capacitor assembly 1 between sections of tracer wire 2 which are wrapped around a plastic gas service tubing 4. The purpose of the sections of tracer wire 2 is to permit radio signals to be transmitted along the tracer sections 2, which act as an antennae so the plastic service tubing 4, which is usually buried underground, can be located without excavation.

One end of the tracer wire sections 2 is connected to the steel gas main 3 while the other end terminates above ground, typically at the customer meter service 7.

In the preferred embodiment of the present invention the capacitor assembly 1 permits the transmission of 20 kilohertz or higher pipeline locator signals but will block any direct current cathodic protection current flow that might result from tracer wires 2 shorted to ground because of damaged tracer wire insulation. As 12 volt direct current is used for continuity checks of utilities including piping and sections of tracer wire 2, it is desirable to use a capacitor with a voltage rating higher than 12 volts D.C. A 50 volt D.C. capacitor works quite well.

This works both for galvanic protection systems and for impressed-current protection systems.

Although the description above contains many specificities, these should not be construed as limiting the scope of the invention but as merely providing illustrations of some of the presently preferred embodiments of this invention.

For example, gas mains were used as an example of a utility service. The invention also applies to other utility services such as water or air, or wherever one requires a means of locating underground utilities which include cathodic protection systems which need protection from cathodic protection electircal shorts.

Thus the scope of the invention should be determined by the appended claims in the formal application and their legal equivalents, rather than by the examples given.

I claim:

1. A system for allowing continuous radio detection of underground utilities having plastic service tubing while maintaining cathodic isolation, said system comprising:

a tracer wire including a plurality of sections extending along the plastic tubing; and a capacitor assembly electrically connecting adjacent sections of said tracer wire, wherein said tracer wire is coupled to a metal pipe, said tracer wire being isolated from any cathodic protection current flow resulting from a tracer wire section shorted to ground.

* * * * *